United States Patent
Stagliano, Jr. et al.

(10) Patent No.: US 7,683,828 B2
(45) Date of Patent: Mar. 23, 2010

(54) SYSTEM AND METHOD FOR MEASURING PHASE AND POWER VARIANCE

(75) Inventors: James J. Stagliano, Jr., Daleville, AL (US); James Larry Alford, Enterprise, AL (US); James Rogers Helvin, Enterprise, AL (US); Dean A. Nelson, Enterprise, AL (US)

(73) Assignee: Enterprise Electronics Corporation, Enterprise, AL (US)

( * ) Notice: Subject to any disclaimer, the term of this patent is extended or adjusted under 35 U.S.C. 154(b) by 286 days.

(21) Appl. No.: 11/485,017

(22) Filed: Jul. 12, 2006

(65) Prior Publication Data

US 2008/0012756 A1    Jan. 17, 2008

(51) Int. Cl.
*G01S 7/40* (2006.01)
*G01S 7/03* (2006.01)
*G01S 7/285* (2006.01)
*G01S 13/95* (2006.01)
*G01S 13/00* (2006.01)

(52) U.S. Cl. .................. 342/173; 342/26 R; 342/89; 342/165; 342/175; 342/188; 342/194

(58) Field of Classification Search ........ 342/26 R–26 D, 342/59, 89, 165, 173–175, 188–197, 361–366, 342/118, 124, 147, 149, 153, 159, 176, 179; 702/189; 329/315, 316
See application file for complete search history.

(56) References Cited

U.S. PATENT DOCUMENTS

| | | | | |
|---|---|---|---|---|
| 4,660,044 A | * | 4/1987 | Lavelle | 342/188 |
| 4,684,951 A | | 8/1987 | Baumer | 342/362 |
| 4,742,354 A | * | 5/1988 | Wen et al. | 342/188 |
| 4,766,435 A | * | 8/1988 | Wells | 342/188 |
| 4,811,020 A | * | 3/1989 | Montheil | 342/159 |
| 4,811,021 A | * | 3/1989 | Yoshimoto et al. | 342/361 |
| 4,821,039 A | * | 4/1989 | Crane | 342/153 |
| 4,849,762 A | * | 7/1989 | Barnes | 342/188 |
| 4,868,917 A | | 9/1989 | Woolcock | |
| 4,881,077 A | * | 11/1989 | Jehle et al. | 342/26 B |
| 4,910,468 A | * | 3/1990 | Ohtsuka et al. | 329/316 |
| 4,928,131 A | * | 5/1990 | Onozawa | 342/188 |
| 5,027,123 A | * | 6/1991 | Haykin et al. | 342/188 |

(Continued)

OTHER PUBLICATIONS

Doviak, R.J., Bringi, A. Ryzhkov, A. Zahrai, D.S. Zrnic. "Considerations for Polarimetric Upgrades to Operational WSR-88D Radars," Journal of Atmospheric and Oceanic Technology, Mar. 2000, vol. 17, pp. 257-278.

(Continued)

*Primary Examiner*—Bernarr E Gregory
(74) *Attorney, Agent, or Firm*—Russell Carter Gache; Maynard Cooper & Gale, PC

(57) ABSTRACT

A device and method for measuring phase and power shifts in a simultaneous dual polarization radar system comprises an access port, a quadrature mixer, and a power detector. The access port is configured to couple to the simultaneous dual polarization radar system near the antenna of the simultaneous dual polarization radar system. The quadrature mixer is configured to mix a first signal from a first polarization and a second signal from a second polarization. The first signal and the second signal are sampled through the access port. The first power detector is configured to measure the power level of the first signal.

34 Claims, 4 Drawing Sheets

U.S. PATENT DOCUMENTS

| | | | | |
|---|---|---|---|---|
| 5,073,782 | A * | 12/1991 | Huguenin et al. | 342/179 |
| 5,227,800 | A * | 7/1993 | Huguenin et al. | 342/179 |
| 5,231,404 | A * | 7/1993 | Gasiewski | 342/174 |
| 5,264,856 | A * | 11/1993 | Thurlow | 342/188 |
| 5,334,981 | A * | 8/1994 | Smith et al. | 342/188 |
| 5,420,591 | A * | 5/1995 | Annee et al. | 342/188 |
| 5,500,646 | A * | 3/1996 | Zrnic | 342/188 |
| 5,552,787 | A * | 9/1996 | Schuler et al. | 342/188 |
| 5,621,410 | A | 4/1997 | Gray et al. | |
| 5,691,727 | A * | 11/1997 | Cyzs | 342/361 |
| 5,726,657 | A | 3/1998 | Pergande et al. | 342/202 |
| 5,731,783 | A * | 3/1998 | Graham | 342/188 |
| 5,793,334 | A | 8/1998 | Anderson et al. | |
| 5,940,776 | A | 8/1999 | Baron et al. | |
| 6,061,013 | A | 5/2000 | Sauvageot et al. | |
| 6,359,584 | B1 * | 3/2002 | Cordey et al. | 342/195 |
| 6,473,026 | B1 | 10/2002 | Ali-Mehenni et al. | |
| 6,545,630 | B1 * | 4/2003 | Apa et al. | 342/188 |
| 6,759,976 | B1 * | 7/2004 | Edvardsson | 342/124 |
| 6,759,977 | B1 * | 7/2004 | Edvardsson et al. | 342/124 |
| 6,768,971 | B1 * | 7/2004 | Sparrow et al. | 702/189 |
| 6,781,540 | B1 * | 8/2004 | MacKey et al. | 342/188 |
| 6,803,875 | B1 * | 10/2004 | Alford et al. | 342/26 R |
| 6,859,163 | B2 * | 2/2005 | Alford et al. | 342/26 D |
| 6,911,937 | B1 * | 6/2005 | Sparrow et al. | 342/188 |
| 7,049,997 | B2 * | 5/2006 | Alford et al. | 342/26 R |
| 7,158,071 | B2 * | 1/2007 | Testud et al. | 342/188 |
| 7,196,654 | B2 * | 3/2007 | Edwards et al. | 342/188 |
| 7,262,729 | B1 * | 8/2007 | Hershey et al. | 342/195 |
| 7,355,546 | B2 * | 4/2008 | Randall | 342/26 R |

OTHER PUBLICATIONS

Liu, Y., J.W. Conway, E.A. Brandes, A.V. Rzyhkov, J. Vivekanandan, D.S. Zrnic, and R. Oye. "The Use of Polarization Data in the Operational Identification of Hydromeoter and Non-hydrometeor Targets." Preprints, 29th Conf. Radar Meteor. Montreal, Canada: American Meteorological Society 1999: pp. 178-179.

Ryzhkov A., R. Lopez, R. Fulton, D. Zrnic, T. Schuur and Y. Liu. "Hydrometeor Classification with a Polarimetric Radar for Improved Rainfall Measurements and Detection of Hail and Electrically Charged Regions." Preprints, 29th Conference on Radar Meteorology. Montreal, Canada: American Meteorological Society, 1999: pp. 289-292.

Next Generation Weather Radar Program Operational Support Facility.

Vivekanandan, J., D.S. Zrnic, S.M. Ellis, R. Oye, A.V. Ryzhkov, and J. Straka "Cloud Microphysics Retrieval Using S-band Dual-polarization Radar Measurements." Bulletin of the American Meteorological Society 1999: pp. 381-388.

Zahrai Allen and Dr. Dusan Zrnic. "Implementation of Polarimetric Capability for the WSR-88D (NEXRAD) Radar." Long Beach, CA. American Meteorological Society 1997.

Zrnic, D.S., and A.V. Ryzhkov. "Polarimetry for Weather Surveillance Radars." Bulletin of the American Meteorological Society 1999: pp. 389-406.

Zrnic, D.S. Zahrai, A. Doviak, R.J., Carter, J. and Torres, S. "Polarimetric Upgrades of the NOAA's WSR-88D Research and Development Radar." 7.14.

* cited by examiner

SYSTEM AND METHOD FOR MEASURING PHASE AND POWER VARIANCE

FIELD OF THE INVENTION

The present invention relates generally to a system and method for measuring phase and power variance in a weather radar system. More particularly, the present invention relates to a system and method for measuring the phase and power variance in the transmission signal between horizontal and vertical channels prior to transmission.

BACKGROUND OF THE INVENTION

In a typical dual channel weather radar system, a transmission signal is generated in an amplifier or a power oscillator, then passed through waveguides, rotary couplers and possibly transmitters and power dividers before being transmitted from an orthogonal feedhorn and antenna into the atmosphere. When a reflected signal is received, the reflected signal is compared to the signal generated by the amplifier or oscillator to determine weather conditions. The power and phase of the signal, relative to the transmitted signal, are important in determining the weather characteristics. Thus, having an accurate depiction of the transmitted signal is necessary in forming an accurate picture of the weather conditions.

Components in a weather radar system may introduce delays in the signal (thus shifting the phase of the signal) and may also lose power from the signal prior to transmission. For example, as the signal is passed across rotary couplers in the transmission path to the antenna, some of the signal may be lost in the coupling, and may be delayed so that the phase and power of the signal changes after it passes through the coupling. Thus, any comparison of the transmitted signal to the received signal is more accurate if the comparison includes the delay and power loss through the coupler.

In single polarized signals, any shift in phase is not as important because the return transmission time, i.e., the reception interval, is much greater than any shift in phase created by the components in the system prior to transmission. However, in a dual channel weather system, a change in phase of the signal on one of the channels relative to the signal of the other channel introduces additional error because the analysis of a dual channel weather system includes analysis of the two received signals relative to each other. Thus, any change in phase due to delays within the system may effect the analysis of the signals.

Moreover, any delays in the system or loss in signal power also effects the range of the signal. If delays in the signal are present, then the interval between signals must be longer to allow for the delay. In order to maintain the same interval, then the range would effectively be limited by the delay, or estimated delay. In addition, the maximum range is proportional to the transmitted power raised to the ¼ power. Thus, signal delays and power loss may limit the range. Such delays may be minimized by a system that can accurately determine when components are causing delays and losses for replacement of components.

SUMMARY OF THE INVENTION

A measurement device for measuring phase and power shifts in a simultaneous dual polarization radar system comprises an access port configured to couple to the simultaneous dual polarization radar system near the antenna of the simultaneous dual polarization radar system; a quadrature mixer configured to mix a first signal from a first polarization and a second signal from a second polarization, the first signal and the second signal sampled through the access port; and a first power detector configured to measure the power level of the first signal.

DESCRIPTION OF THE PREFERRED EMBODIMENTS

Figure 1:
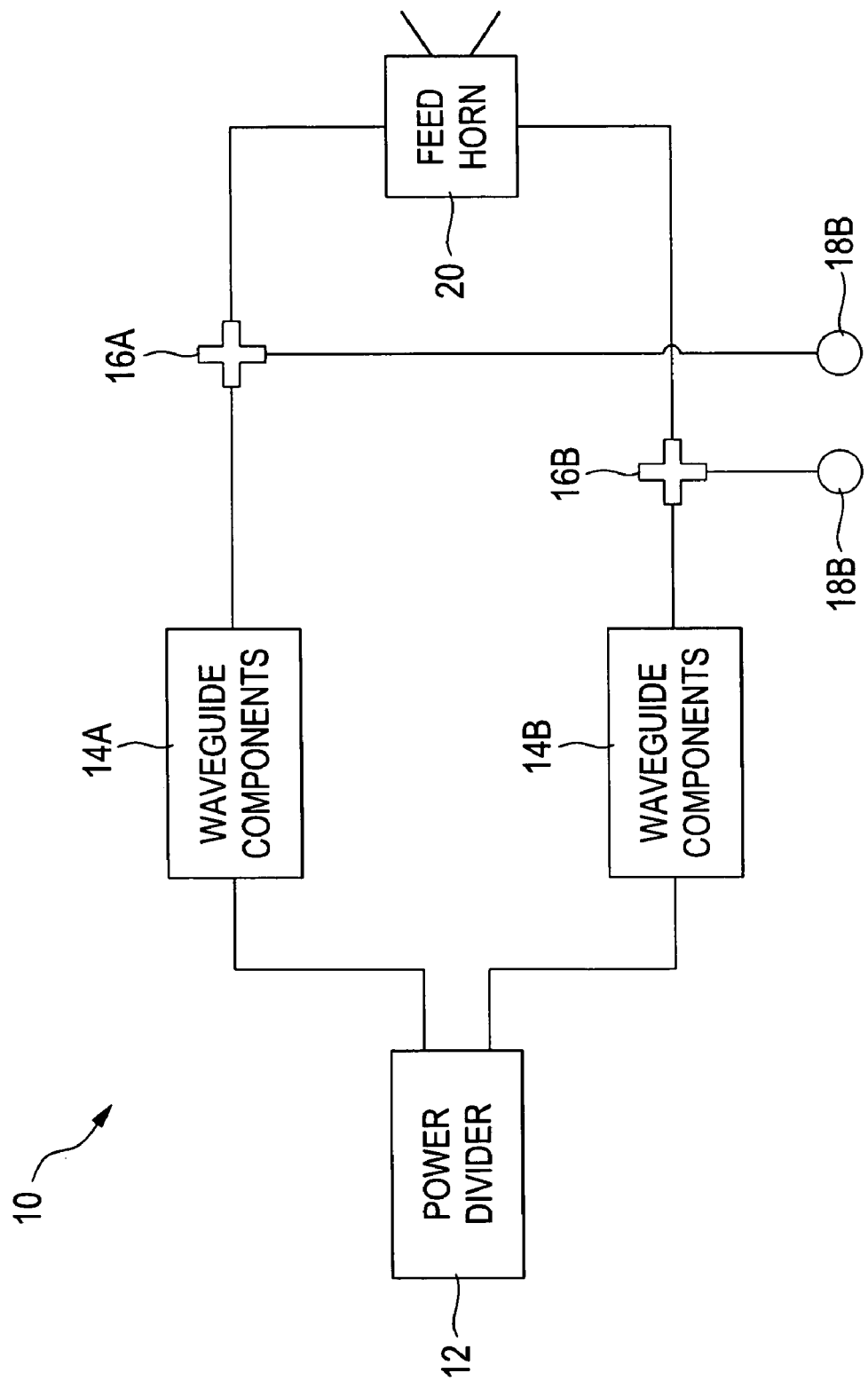
FIG. 1 is a block diagram of an embodiment of a weather radar system configured with a single transmitter.

Turning now to the drawing figures, FIG. 1 is a block diagram of an embodiment of a weather radar system 10 configured with a single transmitter. The weather radar system 10 includes a power divider 12, waveguide components 14A and 14B, couplers 16A and 16B, sampling ports 18A and 18B, and a feed horn 20. The power divider 12 passes a horizontal signal and a vertical signal through the waveguide components 14A and 14B to a feed horn 20. The couplers 16A and 16B sample the horizontal and vertical signals after the signals have been passed through the waveguide components 14A and 14B.

The power divider 12 receives a high power RF signal. In one embodiment, the high power RF signal is generated from a stable local oscillator generating a stable local oscillator signal. The stable local oscillator signal is amplified in a RF tube and passed to the power divider 12. The power divider 12 may be a four port ISO terminated divider. The divider 12 may provide 20 dB of isolation from the output to the input. The forward insertion loss may be less than 0.2 dB per channel above 3 dB.

The power divider 12 divides the signal into horizontal and vertical signal components for transmission. These signals are also passed from the power divider 12 to the signal processor so that the processor can compare the power divided signal to the transmitted signal, and also compare the power divided signal to the sampled signal after the horizontal and vertical signals have passed through the waveguide components 14A and 14B.

Waveguide components 14A and 14B pass the horizontal and vertical signals to the feedhorn 20 for transmission. The waveguide components 14A and 14B may include rotary couplers, circulators, burst sample couplers, and filter components. These waveguide components 14A and 14B are implemented to pass the transmission signal from the generating components, e.g., a klystron, magnetron, or TWT, to the feedhorn 20 for transmission.

A fundamental trade off exists in this process. The antenna is seated in a rotating frame so that the directional signal may be propagated in different directions. The generating components are generally located in a fixed frame, which means the signal must be passed from a fixed frame generator to a rotating frame for transmission. This process requires a transmission line made up of waveguide components 14A and 14B, including a rotating RF transmission line joint between the rotating antenna system and fixed generating components. Various forms of such rotating joints or couplings have been developed and are known in this art. A few of these include the rotating circular waveguide joint, the rotating coaxial coupling, and various hybrid arrangements in which there are one or more transitions from one transmission line medium to another. The inclusion of these joints allow for additional degrees of freedom in positioning the feedhorn 20 for transmission.

These joints, however, may fail over time. As the joints fail, the system 10 may experience losses in power and may experience phase shifts as the transmitted signal propagates through the joint couplers. The losses and phase shifts may be a function of the direction of the feedhorn 20, such that losses when the azimuth or elevation are changed create different losses and phase shifts compared to other azimuth and elevation angles. By sampling the signals after the transmitted signals have been passed through the joint couplers, the system 10 may monitor the effects of the joint couplers on the degradation of the transmitted signal. As the performance of the joints fails, by analyzing the histogram of the relative power and phase shifts of the signals at different angles, the failing joints may be identified.

Another waveguide component 14A and 14 B which may be implemented in the system is a circulator. A circulator directs the flow of the transmitted signal and the received signal. In order to minimize waveguide components 14A and 14B in the system 10, a circulator may be placed between the generating components and a receiver so that the transmitted signal follows a path through the circulator to the other waveguide components 14A and 14B while the received signal may be directed from the waveguide components 14A and 14B to the receiver. Similar to a revolving door with three entrances and one mandatory rotating sense, a circulator maintains the flow of power through the system by directing the flow in and out of the fixed system from overlapping.

This rotation is based on the interaction of the electromagnetic wave with magnetized ferrite. A microwave signal generated in the generating components follows the prescribed rotating sense and has to leave the circulator via the waveguide components 14A and 14B connected to the antenna. In circulators, the energy divides into two equal parts at the generating component entrance to the circulator, and propagated at different speeds by the influence of the ferrite. At the port on the circulator which directs the transmitted signal to the receiver, both signal parts are in opposition, and negate each other. At the connection leading to the antenna, both signal parts are in-phase and add themselves up to the complete signal again. Similarly, the received signal at the waveguide port flows to the generating component port out-of-phase and negates the signal there while flowing to the receiver port in phase.

By the symmetric construction of the circulator it is possible always to determine a defined direction by the choice of the connection. If an antenna is in a connection, transmitting energy always flows to the antenna while the received signals always flow to the receiver. When the transmitted signal is passed through the circulator, losses may occur and phase lags may occur. If the propagation speed through the circulator lags, then the split signals at the ports may not properly combine. In such an instance, the power may drop and the phase may shift. These phase and power shifts effect the performance of the system by degrading the power levels and creating phase shifts in both the transmitted and received signals.

Another type of waveguide component used in weather radar systems is a coupler, such as a directional coupler. The coupler samples the transmitted signal as the signal passes to the feedhorn 20. A directional coupler is a passive device which couples part of the transmission power by a known amount as the signal passes through the coupler and out through another port, often by using two transmission lines set close enough together so energy passing through one transmission line is coupled to the other transmission line. In one embodiment, a directional coupler has four ports: input, transmitted, coupled, and isolated. The signal that is passed to the feedhorn 20 enters the coupler through the input port and exits the coupler through the transmit port. The term "main line" refers to the section between input and transmitted ports. Often, the isolated port is terminated with an internal or external matched load and not used for passing a signal.

Physical considerations such as internal load on the isolated port will limit port operation. The coupled output from the directional coupler can be used to obtain the information (i.e., frequency and power level) on the transmitted signal without interrupting the main power flow in the system (except for a power reduction). When the power coupled out to the isolation port is half the input power (i.e. 3 dB below the input power level), the power on the main transmission line is also 3 dB below the input power and equals the coupled power. Such a coupler is referred to as a 90 degree hybrid, hybrid, or 3 dB coupler. The frequency range for coaxial couplers specified by manufacturers is that of the coupling arm. The main arm response is much wider (i.e. if the spec is 2-4 GHz, the main arm could operate at 1 or 5 GHz). In most applications, the coupler will have higher coupling ratios so that the insertion loss is less.

If the coupling is not correct, then the insertion loss will increase. This means less energy is transmitted. Other errors in the coupler, such as incorrectly matching the load on the coupled line, may also drop the performance of the system. By examining the signal close to the feedhorn 20, errors in couplers may be diagnosed and corrected by replacing bad couplers and accounting for degradation in the transmitted signal when calculating weather conditions. These types of couplers may also be used as the sampling couplers 16A and 16B, which are used to sample the transmitted signal prior to transmission by the feedhorn 20.

The couplers 16A and 16B are positioned close to the feedhorn 20. The couplers 16A and 16B sample the transmitted signal prior to transmission. The placement of the couplers 16A and 16B close to the feedhorn 20 positions the ports 18A and 18B for performance analysis of the transmission lines most complete. The analysis can occur comparing the original generated signal to the signal immediately before transmission. While the preferred position of the couplers 16A and 16B and the sampling ports 18A and 18B is close to the feedhorn 20, the position of the couplers 16A and 16B and the sampling ports 18A and 18B may be positioned anywhere along the transmission path. For example, if the most common failure occurs at the rotary couplers in a system, it may be more beneficial to position the couplers 16A and 16B and the sampling ports 18A and 18B nearer the rotary couplers. By positioning the couplers 16A and 16B and the sampling ports 18A and 18B a user is allowed to diagnose changes in the transmission line as a whole and may be able to diagnose specific waveguide elements 14A and 14B that may have failed by examining the radar system 10 operationally.

Figure 2:
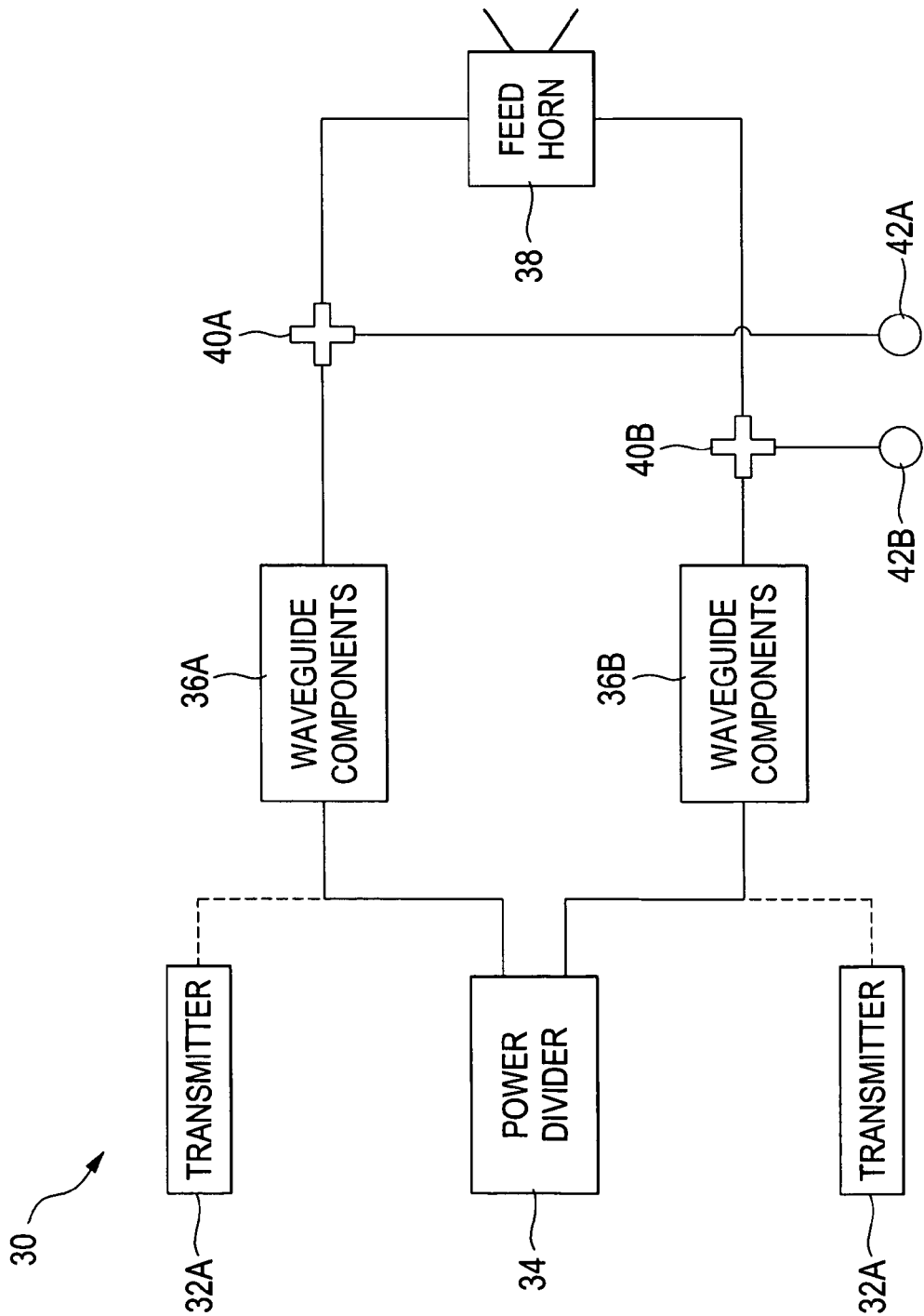
FIG. 2 is a block diagram of another embodiment of a weather radar system configured with dual transmitters.

Turning now to FIG. 2, FIG. 2 is a block diagram of another embodiment of a weather radar system 30 configured with dual transmitters 32A and 32B. In a dual transmitter system, an amplifier amplifies a stable local oscillator signal. A power divider 34 splits the amplified signal into two identical signals. The transmitters 32A and 32B form the horizontal and vertical transmitted signal. The horizontal and vertical signals are passed through waveguide components 36A and 36B to an orthogonal feedhorn 38 which transmits the signal into air.

Couplers 40A and 40B sample the transmitted signal prior to transmission and connect to sample ports 42A and 42B so that the transmitted signals may be analyzed.

Figure 3:
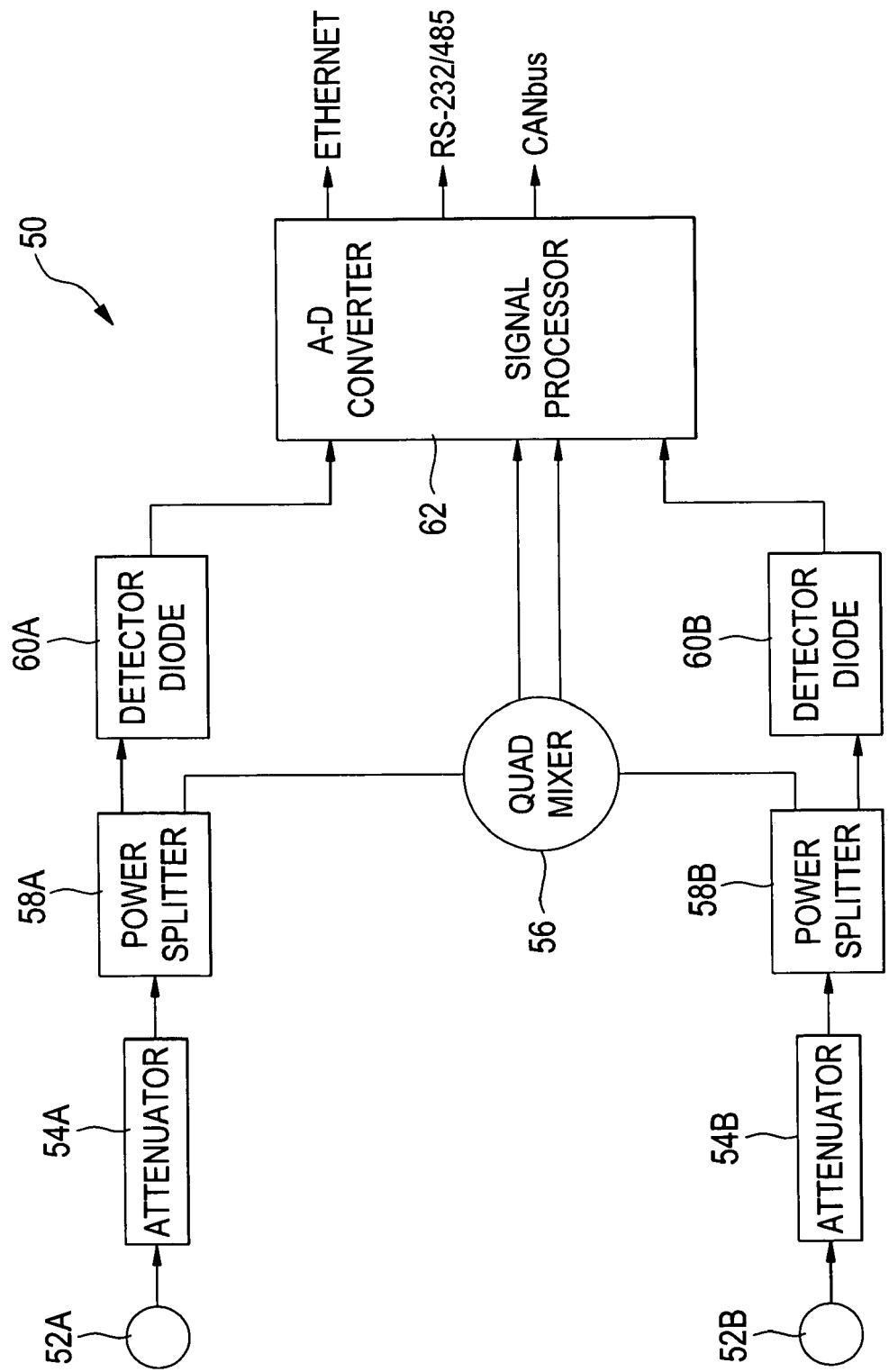
FIG. 3 is a block diagram of a measurement device according to an aspect of the invention.

Many of the parts in the power oscillation radar system 30 behave in the same manner as the similar components in FIG. 1. The processing of the scattered signal is the same, and includes all of the same components. The difference in the systems of FIG. 2 and FIG. 3 is the difference in the generation of the transmitted signal. Both systems use a stable oscillator to form a portion of the transmitted signal and an orthogonal feed horn and antenna to propagate orthogonal vertical and horizontal components.

Other components are generally similar but are used slightly differently. In the power oscillator single transmitter simultaneous dual polarization radar system of FIG. 1, such as a magnetron based system, the power divider 12 splits the amplified signal into two identical signals. In the dual transmitter power amplifier system of FIG. 2, each transmitter 32A and 32B transmits a signal through the waveguide components. In the dual transmitter system 30, one transmitter transmits the horizontal signal while the other transmitter transmits the vertical signal. Additionally, the single transmitter power oscillator system 10 includes a power divider 12 that generates identical signals for the radar system 10.

Turning now to FIG. 3, FIG. 3 is a block diagram of a measurement device 50 according to an aspect of the invention. The measurement device 50 connects to the sample ports of FIGS. 1 and 2 through sample posts 52A and 52B. Attenuators 54A and 54B preset the signal level for the horizontal and vertical channels according to the specifications of a quadrature mixer 56. Power splitters 58A and 58B split the horizontal and vertical channel signals in half. One signal from each of the power splitters 58A and 58B is transmitted to the quadrature mixer 56. The other signal from each of the power splitters 58A and 58B is transmitted to detector diodes 60A and 60B. The output from the quadrature mixer 56 and detector diodes 60A and 60B is sent to an A-D converter and signal processor 62 to develop the data format outputs. The data in the A-D converter 62 may communicate with the radar system or transmit data to a user through an Ethernet connection, a CANbus connection or an RS-232/485 connection.

The attenuators 54A and 54B are passive microwave components which reduce the horizontal and vertical signals by a specified amount when the attenuators 54A and 54B are inserted in the signal path of a system. In order to reduce measurement uncertainties, attenuators 54A and 54B ideally have a low voltage standing wave ratio (VSWR) which make the attenuators 54A and 54B ideal for reducing load VSWR. The attenuators 54A and 54B attenuate the signals in order to reduce the signal to a measurable level.

Attenuators 54A and 54B may be either fixed or variable and either reflective or non-reflective. The performance characteristics to consider in choosing a fixed attenuator include input and output impedances, flatness with frequency, average and peak power handling capability, and temperature dependence. Variable attenuator can be subdivided into step attenuator and continuously variable attenuator. In a step attenuator, the attenuation is changed in steps such as 10 dB, 1 dB or 0.5 dB, while a continuously variable attenuator changes the attenuation continuously and a dial is usually available to read the attenuation either directly or indirectly from a calibration chart. Variable attenuators have the same performance characteristic considerations, and additional characteristics of range of attenuation, insertion loss in the minimum attenuation position, incremental attenuation (for step attenuators), accuracy of attenuation versus attenuator setting, and attenuator switching speed and switching noise.

A reflective attenuator reflects some portion of the input power back to the driving source. The amount reflected is a function of the attenuation level. As an example, if a PIN diode is used as an attenuator and the PIN diode is reverse biased, then the attenuator appears as an open circuit when shunting a transmission line. This permits most of the RF input power to travel to the RF output and does not degrade the transmission signal. When the PIN diode is forward biased, the diode absorbs some input, but simultaneously reflect some back to the transmission line. At high bias current, most RF will be reflected back to the input resulting in a high input VSWR and high attenuation.

As another example, an absorptive attenuator may be used. The VSWR of a non-reflective (absorptive) PIN diode attenuator is acceptable at any attenuation level (bias state). The diodes are configured in the form of a Pi network that remains matched for any bias state or by use of a 90° hybrid coupler to cancel the waves reflected to the input connector.

The power splitters 58A and 58B are passive microwave components used for distributing the microwave signals to the quadrature mixer 56 and the detector diodes 60A and 60B. A splitter can be used as either a power combiner or a power divider, and as such is a reciprocal device. Splitters are usually three or four-port networks. N-way splitters are usually constructed as "corporate" splitters, where one two-way splitter feeds a pair of two-ways, which feed four two-ways, etc. Different types of splitters, such as Gysel power splitters, Wilkinson power splitters, Lim-Eom power splitters, and Saleh N-way splitters, exist with different characteristics. Some of these splitters change the relative phase of the signals as the signals are split. A phase change is unimportant when the output signals from the power splitter are passed to detector diodes 60A and 60B for measuring power, but care should be taken with any relative phase shift between the LO (i.e "Local Oscillator") and RF signals sent to the quadrature mixer 56.

The detector diodes 60A and 60B detect the power levels of the horizontal and vertical transmission signals. In a preferred embodiment, the detector diodes are Schottky type detector diodes. The detector diodes 60A and 60B measure the power variation between the horizontal and vertical channels so that the signal processor may correct any power bias created from losses in the system. By using the diode, the RF signal is rectified so that the analysis of the power signal is used to detect an amplitude for power. A diode, such as the Schottky diode, has low forward voltage drop and high switching speed, which is beneficial in RF applications. Other detectors, which can respond to the amplitude of the RF signals, may be used to measure the power of the horizontal and vertical signals.

The quadrature mixer 56 extracts the phase relationship between the LO and RF signals from the power splitters 58A and 58B. The quadrature mixer 56 outputs the in-phase and quadrature (I and Q) signals in a video format. The I and Q signals are generally used for detecting the presence of hydrometeors in the environment. The signals from the quadrature mixer 56, however, are signals prior to transmission. Thus, changes in the I and Q signals prior to transmission are created from the degradation of the signals within the radar system. Such changes would propagate out and would be identified as part of the weather pattern when the transmitted signal is received at the antenna. Thus, combined with the information from the detector diodes 60A and 60B, the information from the quadrature mixer 56 may identify the relative phase shift and power shift prior to propagation.

The A-D converter 62 receives power signals from the detector diodes 60A and 60B and the video format for the I and Q signals from the quadrature mixer 56. These signals are used to determine the phase and power shifts within the radar system. Differences in power between the two channels will also effect a bias shift within the quadrature mixer 56. The A-D converter 62, then, receives both the power and phase information to correct the bias shift from the quadrature mixer 56. Once the information is processed in the A-D converter 62, the information is sent to the radar system for processing.

Processing of the information by the radar system corrects the analysis of the received signal and also helps identify problems within the radar system by comparing the sample of the transmission signal near the antenna against the idealized (i.e. reference) transmission signal which is used to process the received signal in a dual simultaneous polarization radar system. An accurate depiction of the transmitted signal is necessary in forming an accurate picture of the weather conditions. By sampling the signals after the transmitted signals have been passed through the radar components, the radar system may monitor the effects of the radar system components on the degradation of the transmitted signal. As the performance of the radar system components fails, the information from the A-D converter 62 may be analyzed and a histogram of the relative power and phase shifts of the signals at different angles may be reviewed to identify the failing radar system components.

The placement of the measurement device 50 also allows the received signal to be analyzed prior to transmission through the radar system components. In this analysis, the radar system may compare information of the received signal prior to passing the signal through the radar waveguide components. Some of the problems of degradation during propagation will also occur during the process of passing the received signal back through the weather radar system. During the reception process, the comparison proceeds in reverse, i.e., the signal in the measurement device 50 is the signal against which the degradation of the signal is measured. By analyzing both the transmitted and received signals, the accuracy of the radar system may be improved. Other characteristics such as effective range of the radar, repeatability, and speed of the radar may benefit from the implementation of the measuring device 50 within a radar system.

Figure 4:
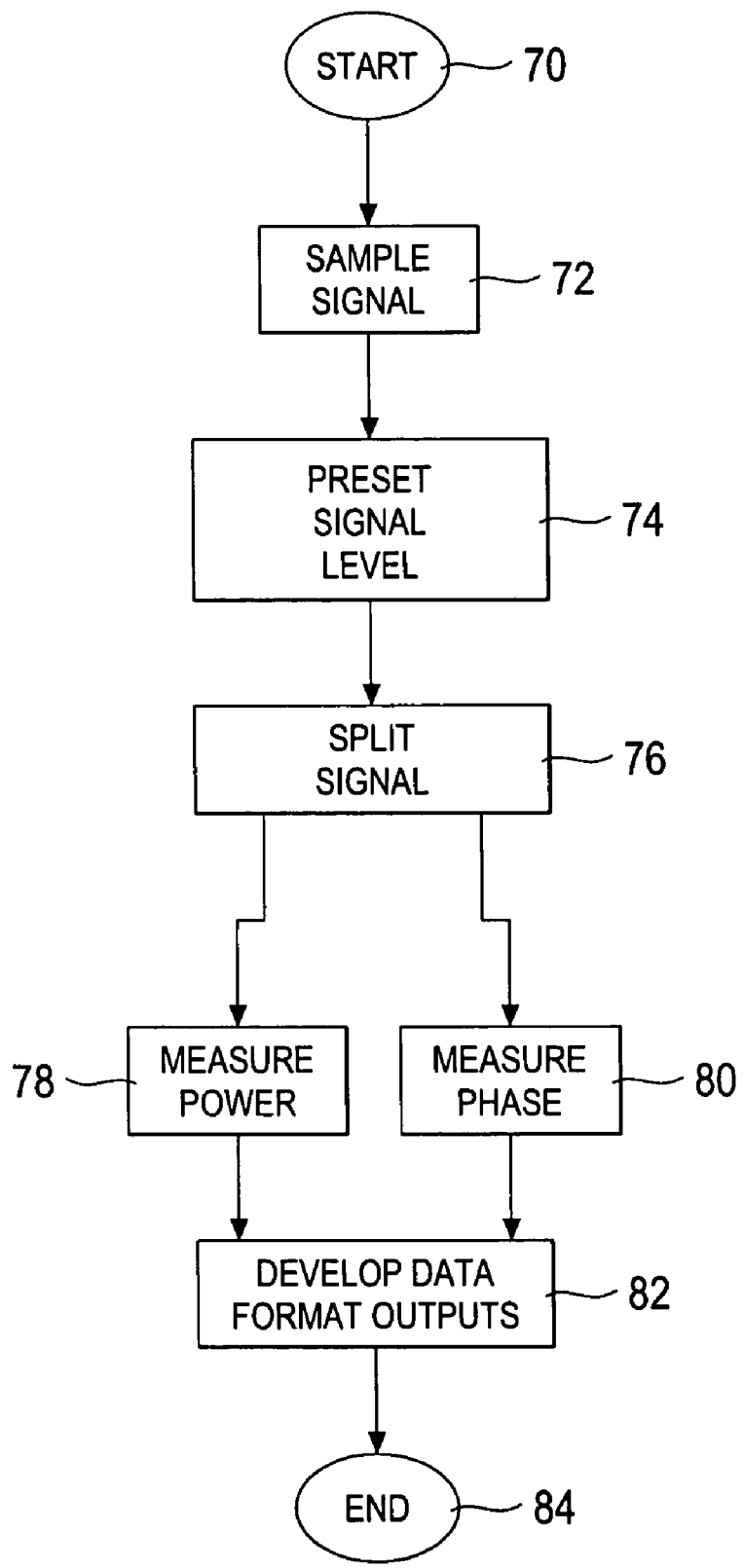
FIG. 4 is a flowchart of the steps of an embodiment of the invention.

Turning now to FIG. 4, FIG. 4 is a flowchart of the steps of an embodiment of the invention. The method begins at step 70. The signal is sampled at step 72. The signal level is preset in step 74. Step 76 splits the signal into 2 signals. The two signals are passed to a power measurement step 78 and a phase measurement step 80. The measurements from steps 78 and 80 are passed to step 82 which develops data format outputs. The method ends in step 84.

Step 74 may be performed by attenuators. In step 74, the signal is preset by reducing the horizontal and vertical signals by a specified amount when inserted in the signal path of a system. In order to reduce measurement uncertainties, step 72 ideally reduces the signal to a low voltage standing wave ratio (VSWR) which reduces load VSWR. The preset signal level step 74 reduces the signal to a measurable level.

Step 76 splits the signal into two signals to distribute the microwave signals to measure power and measure phase. Some devices designed to split signals may change the relative phase of the signals as the signals are split. A phase change is unimportant when the output signals is used to measure power, but care should be taken with any relative phase shift between the LO and RF signals sent to phase measurement.

The power measurement step 78 detects the power levels of the horizontal and vertical transmission signals. Step 78 measures the power variation between the horizontal and vertical channels so that a signal processor may correct any power bias created from losses in the system. The RF signal is rectified so that the analysis of the power signal is used to detect an amplitude for power. Detectors, which can respond to the amplitude of the RF signals, may be used to measure the power of the horizontal and vertical signals.

Step 80 extracts the phase relationship between the LO and RF signals and outputs the in-phase and quadrature (I and Q) signals in a video format. The I and Q signals are generally used for detecting the presence of hydrometeors in the environment. The phase measurement signals however, are signals prior to transmission. Thus, changes in the I and Q signals prior to transmission are created from the degradation of the signals within the radar system. Such changes would propagate out and would be identified as part of the weather pattern when the transmitted signal is received at the antenna. Thus, combined with the information from the power measurement step 78, the information from the phase measurement step 80 may identify the relative phase shift and power shift prior to propagation.

While the invention has been shown in embodiments described herein, it will be obvious to those skilled in the art that the invention is not so limited but may be modified with various changes that are still within the spirit of the invention.

Having set forth the nature of the present invention, what is claimed is:

1. A measurement device for measuring phase variance and power levels in a simultaneous dual polarization radar system having two transmission conduits for transmitting radio frequency signals to an antenna for further propagation of said radio frequency signals into space, comprising:
   a. a sampling port coupled to each said transmission conduit;
   b. a quadrature mixer configured to mix a first signal from one said transmission conduit and a second signal from said other transmission conduit to measure phase variance between said first and second signals; and,
   c. at least one power detector configured to measure power levels in at least one of said signals through said sampling ports.

2. The measurement device of claim 1, further comprising a second power detector configured to measure power levels in said other signal.

3. The measurement device of claim 2, wherein said power detectors comprise detector diodes.

4. The measurement device of claim 2, further comprising a first signal splitter configured to split said first signal into two portions; wherein one signal portion is input into said quadrature mixer and said other portion is measured by one of said power detectors.

5. The measurement device of claim 4, further comprising a second signal splitter configured to split said second signal into two portions, wherein one signal portion is input into said quadrature mixer and said other portion is measured by said second power detector.

6. The measurement device of claim 1 further comprising a first attenuator and a second attenuator, each attenuator configured to attenuate each said first and second signal to a level compatible with the specifications of said quadrature mixer.

7. The measurement device of claim 1, further comprising an A-D converter configured to digitize measurement signals from said at least one power detector and digitize in-phase and quadrature output signals from said quadrature mixer.

8. The measurement device of claim 7, wherein said A-D converter is further configured to receive said in-phase and quadrature signals in video format.

9. The measurement device of claim 8, further comprising a micro-processing circuit coupled to said A-D converter for receiving said digitized signals from said quadrature mixer and processing said same, and for receiving said digitized signals from said at least one power detector.

10. The measurement device of claim 9, further comprising a second power detector configured to measure power levels in said other signal.

11. The measurement device of claim 10, wherein said A-D converter is further configured to receive measurements from said second power detector and calculate the phase shift and the power shift of said first signal and said second signal.

12. The measurement device of claim 11, wherein said A-D converter is further configured to calculate a bias shift in said phase shift based upon a relative power shift between said first signal and said second signal.

13. The measurement device of claim 1, wherein each said sampling port are positioned adjacent to said radar antennae and configured to sample received signals from said antenna, and wherein said quadrature mixer is further configured to mix transmitted signals from said transmission conduits with said sampling port received signal samples.

14. The measurement device of claim 1 further including a local oscillator and wherein said quadrature mixer is further configured to receive a reference signal from said local oscillator and wherein said local oscillator has a frequency that enables said quadrature mixer to measure phase variances between said first and second signal.

15. In a simultaneous dual polarization radar system having two transmission conduits for transmitting radio frequency signals to an antenna for further propagation of said signals into space and at least one sampling port coupled to each of said conduits, a method of measuring a phase shift and a power shift in said radio signals comprising the steps of:
   a. receiving a sample of a first signal from one said transmission conduit and a sample of a second signal from said other transmission conduit adjacent to said antenna of said simultaneous dual polarization radar system;
   b. receiving a first reference signal and a second reference signal;
   c. comparing said sample of said first signal to said first reference signal and comparing said sample of said second signal to said second reference signal; and,
   d. calculating a phase shift between said sample of said first signal and said sample of said second signal and a power shift between said sample of said first signal and said sample of said second signal.

16. The method of claim 15, wherein said step of receiving samples of first and second signals comprises sampling said signals from said sampling ports and wherein said method further comprises the step of attenuating said first signal and said second signal to a level compatible with a quadrature mixer.

17. The method of claim 16, further comprising the step of splitting said first signal into two portions.

18. The method of claim 17, further comprising the step of measuring the power of said first signal through one of said signal portions.

19. The method of claim 18, further comprising the step of receiving the measurement of the power of said first signal and receiving in-phase and quadrature signals from said quadrature mixer.

20. The method of claim 19, further comprising the step of measuring the power of said second signal.

21. The method of claim 20, further comprising the step of splitting said second signal into two portions and measuring the power of said second signal through one of said portions; and wherein said first signal and said second signal have the same phase.

22. The method of claim 20, further comprising the step of calculating the phase shift and the power shift of said first signal and said second signal using said in-phase and quadrature signals and said power measurements of said first and second signals.

23. The method of claim 22, further comprising the step of calculating a bias shift in said phase shift based upon a relative power shift between said first signal and said second signal.

24. The method of claim 15, further comprising the step of sampling a received signal from said antenna, and wherein said first sample of said first signal and said sample of said received signal are compared to one another through a quadrature mixer.

25. The method of claim 15, further comprising the step of defining an antenna location when said sampling step occurs.

26. The method of claim 25, further comprising the step of recording said antenna location, said phase shift and said power shift.

27. The method of claim 26, further comprising the step of creating a histogram of said phase shift and said power shift as a function of said antenna location.

28. An apparatus for measuring phase variance and power levels in a simultaneous dual polarization radar system having two transmission conduits for transmitting radio frequency signals to an antenna for further propagation of said radio frequency signals into space, comprising:
   a. means for sampling radio signals from said radar transmission conduits;
   b. means for mixing said transmission samples;
   c. means for measuring power levels in at least one of said signals; and,
   d. means for comparing a reference signal to each said transmission signal to measure phase variance between the two, and means for comparing power in each transmission signal to a reference signal.

29. The device of claim 28, wherein said mixing means comprises a quadrature mixer, and wherein said comparing means comprises a power detector configured to measure the power level of said samples of said signals.

30. The device of claim 29, further comprising a second power detector configured to measure power levels in said radio frequency signals.

31. The device of claim 30, further comprising a signal splitter configured to split one of said signals into two portions and wherein said second power detector is configured to measure power levels in one of said signals in one of said portions.

32. The device of claim 31, further comprising an A-D converter configured to receive measurements of the power of one of said signals from said second power detector and is further configured to calculate phase shifts and the power shifts of said samples of said signals based upon in-phase signal, said quadrature signal parameters.

33. The device of claim 32, wherein each said sampling means are positioned adjacent to said radar antennae and configured to sample received signals from said antenna, and wherein said mixer means is further configured to mix transmitted signals from said transmission conduits with said sampling means received signal samples.

34. The method of claim 33, further comprising means for producing a histogram of said phase shift and said power shift as a function of said antenna location.

* * * * *